(12) United States Patent
Huitema et al.

(10) Patent No.: US 7,929,689 B2
(45) Date of Patent: Apr. 19, 2011

(54) CALL SIGNS

(75) Inventors: Christian François Huitema, Clyde Hill, WA (US); Josh D. Benaloh, Redmond, WA (US); Kim Cameron, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 10/882,079

(22) Filed: Jun. 30, 2004

(65) Prior Publication Data

US 2006/0005013 A1    Jan. 5, 2006

(51) Int. Cl.
| H04K 1/00 | (2006.01) |
| H04L 9/00 | (2006.01) |
| H04L 9/28 | (2006.01) |
| H04L 29/06 | (2006.01) |
| H04L 9/30 | (2006.01) |

(52) U.S. Cl. .............. 380/28; 380/29; 380/30; 713/162; 713/164; 713/165

(58) Field of Classification Search .................. 713/162; 380/28–30
See application file for complete search history.

(56) References Cited

U.S. PATENT DOCUMENTS

| 5,005,200 | A | 4/1991 | Fischer |
| 5,473,691 | A | 12/1995 | Menezes et al. |
| 5,511,122 | A | 4/1996 | Atkinson |
| 5,563,998 | A | 10/1996 | Yaksich et al. |
| 5,673,319 | A | 9/1997 | Bellare et al. |
| 5,729,608 | A | 3/1998 | Janson et al. |
| 5,778,065 | A | 7/1998 | Hauser et al. |
| 5,784,562 | A | 7/1998 | Diener |
| 5,787,172 | A | 7/1998 | Arnold |
| 5,848,244 | A | 12/1998 | Wilson |
| 5,854,898 | A | 12/1998 | Riddle |
| 5,892,904 | A | 4/1999 | Atkinson et al. |
| 5,903,721 | A | 5/1999 | Sixtus et al. |
| 5,917,480 | A | 6/1999 | Tafoya et al. |
| 5,944,794 | A | 8/1999 | Okamoto et al. |
| 5,987,376 | A | 11/1999 | Olson et al. |
| 6,028,938 | A | 2/2000 | Malkin et al. |
| 6,055,234 | A | 4/2000 | Aramaki |
| 6,055,236 | A | 4/2000 | Nessett et al. |
| 6,078,948 | A | 6/2000 | Podgorny et al. |
| 6,088,700 | A | 7/2000 | Larsen et al. |
| 6,088,805 | A | 7/2000 | Davis et al. |
| 6,101,499 | A | 8/2000 | Ford et al. |

(Continued)

FOREIGN PATENT DOCUMENTS

EP    1248441    10/2002

(Continued)

OTHER PUBLICATIONS

European Patent Office "European Search Report" for European Patent Application No. 05 105 417.9-2212, The Hague, Aug. 17, 2006.

(Continued)

*Primary Examiner* — Nirav B Patel
*Assistant Examiner* — Randal D Moran
(74) *Attorney, Agent, or Firm* — Wolf, Greenfield & Sacks, P.C.

(57) ABSTRACT

A method of generating a call sign. A method of generating a call sign comprising determining a distinguished qualifier, finding a distinguished salt, and hashing the distinguished salt with the distinguished qualifier.

20 Claims, 10 Drawing Sheets

U.S. PATENT DOCUMENTS

| | | | |
|---|---|---|---|
| 6,108,673 | A | 8/2000 | Brandt et al. |
| 6,108,687 | A | 8/2000 | Craig |
| 6,128,738 | A | 10/2000 | Doyle et al. |
| RE36,946 | E | 11/2000 | Diffie et al. |
| 6,148,405 | A | 11/2000 | Liao et al. |
| 6,154,541 | A * | 11/2000 | Zhang ............................ 380/28 |
| 6,155,840 | A | 12/2000 | Sallette |
| 6,163,809 | A | 12/2000 | Buckley |
| 6,175,833 | B1 | 1/2001 | West et al. |
| 6,216,110 | B1 | 4/2001 | Silverberg |
| 6,229,806 | B1 | 5/2001 | Lockhart et al. |
| 6,233,606 | B1 | 5/2001 | Dujari |
| 6,237,025 | B1 | 5/2001 | Ludwig |
| 6,237,035 | B1 | 5/2001 | Himmel et al. |
| 6,247,029 | B1 | 6/2001 | Kelley et al. |
| 6,269,099 | B1 | 7/2001 | Borella et al. |
| 6,279,110 | B1 | 8/2001 | Johnson et al. |
| 6,308,266 | B1 | 10/2001 | Freeman |
| 6,327,652 | B1 | 12/2001 | England et al. |
| 6,341,349 | B1 | 1/2002 | Takaragi et al. |
| 6,363,352 | B1 | 3/2002 | Dailey et al. |
| 6,367,009 | B1 | 4/2002 | Davis et al. |
| 6,367,012 | B1 | 4/2002 | Atkinson et al. |
| 6,397,303 | B1 | 5/2002 | Arimilli et al. |
| 6,405,290 | B1 | 6/2002 | Arimilli et al. |
| 6,421,673 | B1 | 7/2002 | Caldwell et al. |
| 6,424,718 | B1 | 7/2002 | Holloway |
| 6,424,981 | B1 | 7/2002 | Isaac et al. |
| 6,526,411 | B1 | 2/2003 | Ward |
| 6,526,506 | B1 | 2/2003 | Lewis |
| 6,529,932 | B1 | 3/2003 | Dadiomov et al. |
| 6,578,143 | B1 * | 6/2003 | Rose ............................ 713/164 |
| 6,600,823 | B1 | 7/2003 | Hayosh |
| 6,615,348 | B1 | 9/2003 | Gibbs |
| 6,636,889 | B1 | 10/2003 | Estrada et al. |
| 6,658,568 | B1 | 12/2003 | Ginter et al. |
| 6,671,804 | B1 | 12/2003 | Kent |
| 6,675,205 | B2 | 1/2004 | Meadway et al. |
| 6,687,755 | B1 | 2/2004 | Ford et al. |
| 6,701,344 | B1 | 3/2004 | Holt et al. |
| 6,714,966 | B1 | 3/2004 | Holt et al. |
| 6,728,753 | B1 | 4/2004 | Parasnis et al. |
| 6,732,110 | B2 | 5/2004 | Rjaibi et al. |
| 6,745,178 | B1 | 6/2004 | Emens et al. |
| 6,782,103 | B1 | 8/2004 | Arthan et al. |
| 6,782,294 | B2 | 8/2004 | Reich et al. |
| 6,789,189 | B2 | 9/2004 | Wheeler et al. |
| 6,791,582 | B2 | 9/2004 | Linsey et al. |
| 6,801,604 | B2 | 10/2004 | Maes et al. |
| 6,832,322 | B1 | 12/2004 | Boden et al. |
| 6,938,166 | B1 | 8/2005 | Sarfati et al. |
| 6,941,366 | B2 | 9/2005 | Antes et al. |
| 6,941,384 | B1 | 9/2005 | Aiken, Jr. et al. |
| 6,944,672 | B2 | 9/2005 | Crow et al. |
| 6,957,346 | B1 | 10/2005 | Kivinen et al. |
| 6,968,179 | B1 | 11/2005 | De Vries |
| 7,032,242 | B1 | 4/2006 | Grabelsky et al. |
| 7,051,202 | B2 | 5/2006 | Tsunoo |
| 7,134,019 | B2 | 11/2006 | Shelest et al. |
| 7,216,233 | B1 | 5/2007 | Krueger |
| 7,370,197 | B2 | 5/2008 | Huitema |
| 7,409,544 | B2 | 8/2008 | Aura |
| 7,478,120 | B1 | 1/2009 | Zhang |
| 7,624,264 | B2 | 11/2009 | Aura et al. |
| 2001/0010720 | A1 | 8/2001 | Kimball et al. |
| 2001/0035976 | A1 | 11/2001 | Poon |
| 2001/0053213 | A1 | 12/2001 | Truong et al. |
| 2002/0032765 | A1 | 3/2002 | Pezzutti |
| 2002/0073204 | A1 | 6/2002 | Dutta et al. |
| 2002/0097267 | A1 | 7/2002 | Dinan et al. |
| 2002/0133607 | A1 | 9/2002 | Nikander |
| 2002/0140730 | A1 | 10/2002 | Linsey et al. |
| 2002/0143989 | A1 | 10/2002 | Huitema et al. |
| 2002/0152380 | A1 | 10/2002 | O'Shea et al. |
| 2002/0152384 | A1 | 10/2002 | Shelest et al. |
| 2002/0154172 | A1 | 10/2002 | Linsey et al. |
| 2002/0156875 | A1 | 10/2002 | Pabla |
| 2002/0184358 | A1 | 12/2002 | Traversat et al. |
| 2003/0014485 | A1 | 1/2003 | Banatwala |
| 2003/0018701 | A1 | 1/2003 | Kaestle |
| 2003/0018813 | A1 | 1/2003 | Antes et al. |
| 2003/0028585 | A1 | 2/2003 | Yeager et al. |
| 2003/0028790 | A1 | 2/2003 | Bleumer |
| 2003/0036941 | A1 | 2/2003 | Leska et al. |
| 2003/0055892 | A1 | 3/2003 | Huitema et al. |
| 2003/0065934 | A1 | 4/2003 | Angelo et al. |
| 2003/0070067 | A1 | 4/2003 | Saito |
| 2003/0088544 | A1 | 5/2003 | Kan et al. |
| 2003/0110274 | A1 | 6/2003 | Pazi et al. |
| 2003/0120929 | A1 | 6/2003 | Hoffstein et al. |
| 2003/0126027 | A1 | 7/2003 | Nelson et al. |
| 2003/0126436 | A1 * | 7/2003 | Greenberg et al. ............ 713/168 |
| 2003/0135629 | A1 | 7/2003 | Sasaki et al. |
| 2003/0142823 | A1 | 7/2003 | Swander et al. |
| 2003/0163683 | A1 | 8/2003 | Xu et al. |
| 2003/0196060 | A1 | 10/2003 | Miller |
| 2003/0217073 | A1 | 11/2003 | Walther et al. |
| 2003/0217106 | A1 | 11/2003 | Adar et al. |
| 2003/0233568 | A1 | 12/2003 | Maufer et al. |
| 2004/0008845 | A1 | 1/2004 | Le et al. |
| 2004/0010683 | A1 | 1/2004 | Huitema |
| 2004/0010688 | A1 | 1/2004 | Matsuzaki et al. |
| 2004/0034794 | A1 | 2/2004 | Mayer |
| 2004/0063401 | A1 | 4/2004 | Meckelburg et al. |
| 2004/0064693 | A1 | 4/2004 | Pabla et al. |
| 2004/0078436 | A1 | 4/2004 | Demsky et al. |
| 2004/0082351 | A1 | 4/2004 | Westman |
| 2004/0088325 | A1 | 5/2004 | Elder et al. |
| 2004/0088537 | A1 | 5/2004 | Swander et al. |
| 2004/0111423 | A1 | 6/2004 | Irving et al. |
| 2004/0117446 | A1 | 6/2004 | Swanson |
| 2004/0122898 | A1 | 6/2004 | Srinivasa |
| 2004/0122901 | A1 | 6/2004 | Sylvain |
| 2004/0128350 | A1 | 7/2004 | Topfl et al. |
| 2004/0141005 | A1 | 7/2004 | Banatwala et al. |
| 2004/0143603 | A1 | 7/2004 | Kaufmann et al. |
| 2004/0151322 | A1 | 8/2004 | Sovio et al. |
| 2004/0158714 | A1 | 8/2004 | Peyravian et al. |
| 2004/0172455 | A1 | 9/2004 | Green et al. |
| 2004/0172456 | A1 | 9/2004 | Green et al. |
| 2004/0181689 | A1 | 9/2004 | Kiyoto |
| 2004/0184445 | A1 | 9/2004 | Burne |
| 2004/0193875 | A1 | 9/2004 | Aura |
| 2004/0225881 | A1 | 11/2004 | Walmsley |
| 2004/0243819 | A1 | 12/2004 | Bourne et al. |
| 2004/0249757 | A1 | 12/2004 | Walmsley |
| 2004/0249970 | A1 | 12/2004 | Castro et al. |
| 2004/0249972 | A1 | 12/2004 | White et al. |
| 2004/0260771 | A1 | 12/2004 | Gusler et al. |
| 2005/0009537 | A1 | 1/2005 | Crocker et al. |
| 2005/0010794 | A1 | 1/2005 | Carpentier et al. |
| 2005/0027805 | A1 | 2/2005 | Aoki |
| 2005/0027871 | A1 | 2/2005 | Bradley |
| 2005/0038856 | A1 | 2/2005 | Krishnasamy et al. |
| 2005/0055280 | A1 | 3/2005 | Jeans |
| 2005/0066001 | A1 | 3/2005 | Benco et al. |
| 2005/0076218 | A1 | 4/2005 | Brown |
| 2005/0080859 | A1 | 4/2005 | Lake |
| 2005/0102245 | A1 | 5/2005 | Edlund et al. |
| 2005/0102356 | A1 | 5/2005 | Manion et al. |
| 2005/0135381 | A1 | 6/2005 | Dubnicki et al. |
| 2005/0138393 | A1 * | 6/2005 | Challener et al. ............. 713/186 |
| 2005/0160291 | A1 | 7/2005 | Eden et al. |
| 2005/0160477 | A1 | 7/2005 | Saito |
| 2005/0171799 | A1 | 8/2005 | Hull et al. |
| 2005/0182928 | A1 | 8/2005 | Kamalanathan et al. |
| 2005/0193219 | A1 | 9/2005 | Vanstone |
| 2005/0198173 | A1 | 9/2005 | Evans |
| 2005/0203901 | A1 | 9/2005 | Waldvogel et al. |
| 2005/0220023 | A1 * | 10/2005 | Kodialam et al. ............. 370/235 |
| 2005/0228824 | A1 | 10/2005 | Gattuso et al. |
| 2005/0235038 | A1 | 10/2005 | Donatella et al. |
| 2006/0005014 | A1 | 1/2006 | Aura et al. |
| 2006/0020796 | A1 | 1/2006 | Aura et al. |
| 2006/0020807 | A1 | 1/2006 | Aura et al. |
| 2006/0077908 | A1 | 4/2006 | Park et al. |
| 2006/0173959 | A1 | 8/2006 | McKelvie et al. |

| | | | |
|---|---|---|---|
| 2006/0265436 | A1 | 11/2006 | Edmond et al. |
| 2007/0055877 | A1 | 3/2007 | Persson et al. |
| 2007/0143619 | A1 | 6/2007 | Goodman et al. |
| 2007/0192676 | A1 | 8/2007 | Bodin et al. |
| 2007/0245144 | A1 | 10/2007 | Wilson |
| 2009/0019141 | A1 | 1/2009 | Bush et al. |

FOREIGN PATENT DOCUMENTS

| | | |
|---|---|---|
| EP | 1333635 | 8/2003 |
| EP | 1361728 | 11/2003 |
| GB | 2378268 | 2/2003 |
| JP | 2002197246 | 11/2001 |
| WO | 01/20450 | 3/2001 |
| WO | 2004/009550 A1 | 7/2004 |
| WO | 2005/026872 | 3/2005 |
| WO | 2005/078993 A1 | 8/2005 |
| WO | 2006/068450 | 6/2006 |

OTHER PUBLICATIONS

Adam Back "Hashcash—A Denial of Service Counter-Measure", Aug. 1, 2002.
S. Josefsson et al. "The Base16, Base32, and Base64 Data Encodings" IETF Standard, Internet Engineering Task Force, IETF, CH, Jul. 2003.
Adam Back "The Hashcash Proof-of-Work Function", Draft-Hashcash-back-00, Internet-Draft Created Jun. 2003.
Anderson, R. et al. "Security Policies" 43 pgs.
Aura, T. "Cryptographically Generated Addresses (CGA)," RFC 3972, Mar. 2005, [21 pages].
Balfanz. D. et al. "Talking to Strangers: Authentication in Ad-Hoc Wireless Networks", Xerox Palo Alto Research Center, 13 pgs.
Bassi et al. "Towards an IPv6-based Security Framework for Distributed Storage Resources," Communications and Multimedia Security CMS 2003, Oct. 2-3, 2003, [9 pages].
Benantar, M. "The Internet Public Key Infrastructure," IBM Systems Journal, vol. 40, No. 3, 2001, pp. 648-665.
Castro et al., "Secure Routing For Structured Peer-to-Peer Overlay Networks," Usenix, OSDI '02 Paper (OSDI '02 Tech Program Index) pp. 299-314 of the Proceedings, Fifth Symposium on Operating Systems Design and Implementation (OSDI 2002) 22 pages, http://www.usenix.org/events/osdi02/tech/full_papers/castro/castro_html/.
Cheng, P. et al. "Design and Implementation of Modular Key Management Protocol and IP Secure Tunnel on AIX," Jun. 1995, [15 pages].
Cheng, P.C. et al. "A Security Architecture for the Internet Protocol," 1998, vol. 37, No. 1, pp. 42-60.
Clark, D. "IP Datagram Reassembly Algorithms," RFC 815, Jul. 1982, [11 pages].
Dabek et al., Building Peer-to-Peer Systems With Chord, a Distributed Lookup Service, at MIT Laboratory for Computer Science, 6 pages, at http://pdos.lcs.mit.edu/chord (May 2001).
DeFigueiredo et al. "Anal sis of Peer-to-Peer Network Securi Using Gnutella,".
http://www.cs.berkeley.edu/~daw/teaching/cs261-f02/reports/defig.pdf (2002).
Ellison, C., et al. Simple Public Key Certificate, (Internet Draft 1999), at http://www.world.std.com/~cme/spki.txt (Aug. 6, 2001).
Final Office Action issued in U.S. Appl. No. 10/242,705, Mail Date: Feb. 9, 2007.
Gehrmann, C. et al. "Manual Authentication for Wireless Devices", Jan. 23, 2004, pp. 1-9.
Higginson, P. et al. "Development of Router Clusters to Provide Fast Failover in IP Networks," Digital Technical Journal vol. 9, No. 3, 1997, pp. 32-41.
Hinden et al., "IP Version 6 Addressing Architecture," (Mar. 10, 2000).
Hinden et al., IP version 6 Working Group Minutes, Minneapolia IETF, Mar. 18, 2002 [accessed May 29, 2005 from http://www.ietf.org/proceedings/02mar/minutes/ipv6.htm], 13 pgs.
Housely et al., Internet X.509 Public Key Infrastructure Certificate and CRL Profile Network Working Group (Jan. 1999), pp. 1-121, retrieved from http://www.ietf.org/rfc/rfc2459.txt?number=2459 Sep. 18, 2003.

Housley, R., Using Advanced Encryption Standard (AES) CCM Mode with Ipsec Encapsulating Security Payload (ESP), Comments: 4309, Dec. 2005, 13 pgs.
IETF Proceedings, "Security and Mobile IPv6", Mar. 2001 [accessed May 29, 2005 from http://www.ietf.org/proceedings/01mar/slides/mobileip-9], 1 pg.
Intel Technology Journal, "Interoperable Home Infrastructure", vol. 6, Issue 4, Published Nov. 15, 2002, ISSN 1535-766X, 78 pgs.
IPSEC, "Minutes of IPSEC Working Group Meeting", 2.5.2 IP Security Protocol (ipsec), Proceedings of the $52^{nd}$ Internet Engineering Task Force, Dec. 9-14, 2001, Salt Lake City, USA, Last Modified: Nov. 2, 2001, http://www3.ietf.org/proceedings/01dec/195.htm (14 pgs).
Johnson et al., Mobility Support in IPv6, (Apr. 27, 2000) 116 pgs.
Kaufman, C. "Internet Key Exchange (IKEv2) Protocol," RFC 4306, Dec. 2005, [93 pages].
Kempf et al. "Threat Analysis for IPv6 Public Multi-Access Links", draft-kempf-ipng-netaccess-threats-00.txt, Nov. 2001, 7 pgs.
Kent et al. "IP Encapsulating Security Payload (ESP)," Network Working Group, Comments 4303, Dec. 2005, 42 pgs.
Kent et al. "IP Encapsulating Security Payload (ESP)," The Internet Society, RFC 2406, No. 1998, [34 pages].
Kent, C. et al. "Fragmentation Considered Harmful", Digital Equipment Corporation Western Research lab (originally pub. In Proc. SIGCOMM '87, vol. 17, No. 5, Oct. 1987, 13 pgs.
Kent, S. "Security Architecture for the Internet Protocol", Network Working Group, Comments: 4301, Dec. 2005, 95 pgs., http://www.rfc-editor.org/rfc/rfc4301.txt.
Kent, S., "IP Authentication Header", Network Working Group, Comments: 4302, Dec. 2005, 35 pgs., http://rfc.net/rfc4302.html.
Koskiande, T. "Security in Mobile IPv6," Apr. 18, 2002, pp. 1-14.
Laganier, J. "Using IKE with IPv6 Cryptographically Generated Address," Network Working Group, Internet-Draft Feb. 24, 2003, pp. 1-14.
Link, B. et al. "RTP Payload Format for AC-3 Audio," RFC 4148, Oct. 2005, [13 pages].
Maughan et al. "Internet Security Association and Key Management Protocol (ISAKMP)," The Internet Society, RFC 2408, Nov. 1998, [141 pages].
McCune, J. et al. "Seeing-Is-Believing: Using Camera Phones for Human-Verifiable Authentication", School of Computer Science, Carnegie Mellon University, Nov. 2004, CMU-CS-04-174, pp. 1-20.
Nikander et al. Binding Authentication Key Establishment Protocol for Mobile IPv6, draft perkins-bake-01.txt, Jul. 2, 2001, 42 pages.
Nikander et al. "Threat Models introduced by Mobile IPv6 and requirements for Security in Mobile IPv6", draft-team-mobileipmipv6-sec-reqts-00.txt, Jul. 12, 2001, 28 pgs.
Nir, Y. "Repeated Authentication in Internet Key Exchange (IKEv2) Protocol," RFC 4478, Apr. 2006, [5 pages].
Non Final Office Action Issued in U.S Appl. No. 11/159,555 dated Apr. 9, 2009.
Nordmark, "Allocating bit in IID for Mobile IPv6", Mar. 2002, [accessed May 29, 2005 from http://ietf.org/proceedings/02mar/slides/ipv6-13.pdf], 8 pgs.
Nordmark, "Reserving Space in the Interface ID", from Mar. 2002 [accessed May 29, 2005 from http://ietf.org/proceedings/02mar/slides/ipv6-14.pdf], 6 pgs.
Office Action issued in U.S. Appl. No. 10/242,705, Mail Date: Aug. 8, 2006.
Office Action issued in U.S. Appl. No. 10/242,705, Mail Date: Feb. 16, 2006.
Office Action issued in U.S. Appl. No. 10/401,241, Mail Date: Jan. 25, 2007.
Office Action issued in U.S. Appl. No. 10/401,241, Mail Date: Oct. 19, 2007.
Office Action issued in U.S. Appl. No. 11/170,296, Mail Date: Dec. 3, 2008.
PCT International Search Report in PCT/US06/25342, Feb. 6, 2008.
Shannon, C. et al. "Characteristics of Fragmented IP Traffic on Internet Links," Internet Measurement Conference. 2001, pp. 83-97.
Tannenbaum, AS. "Computer Networks", Chapter 4, Prentice-Hall, 1989, [76 page].

Thomson et al., IPv6 Stateless Address Autoconfiguration, RFC 1971 (Aug. 1996) 22 gs downloaded from: htttn://www.ietf.org/rfc1971.txt; on Apr. 11, 2006.

Van De Snapschout, JLA. "The sliding window protocol revisited," Formal Aspects of Computing vol. 7, pp. 3-17, 1995.

Written Opinion for PCT/US2007/009887 mailed Oct. 22, 2007.

Written Opinion for PCT/US2007/010092 mailed Oct. 15, 2007.

"Glossary for the Linux FreeS/WAN project," (Publication Date No Available), 35 pgs.

Erdelsky, P., The Birthday Paradox, EFG, at http://www.efgh.com/math/birthday.htm (Mar. 8, 2002).

"Secure Hash Standard," NIST, FIPS PUB 180-1, http://csrc.nist.goc/fips/fip180-1.txt. (Apr. 1995).

"At What Cost Pervasive? A Social Computing View of Mobile Computing Systems," IBM Research: vol. 38, No. 4, 1999, Pervasive Computing (28 pgs).

"Connecting and Extending Peer-to-Peer Networks" Lion Share White Paper, dated Oct. 2004, 32 pages, http://lionshare.its.psu.edu/main/info/doespresentation/LionshareWP.pdf. Apr. 19, 2005.

"Design Expllorations," IBM Research: Social Computing Group (4 pgs).

"IBM Lotus Instant Messaging and Web Conferencing," IBM Software—IBM Lotus Instant Messaging and Web Conferencing home page (3 pgs) Apr. 19, 2005.

"IBM Workplace Collaboration Services Overview Guide" dated Jan. 2005, 2 pages. (Printed from ftp://ftp.lotus.com/pub/lotusweb/IGM_Workplace_collaboration_service_g224733301_118.pdf on Jul. 1, 2005.

"Presence and Awareness Services," Ramiro Liscano, Professor, SITE, University of Ottawa, 89 pages, dated Jun. 11, 2003; http://www.site.uottawa.ca/-rliscano/tutorials/PresenceAwarenessServices.pdf.

"Publication Related to Pastry," http://research.microsoft.com/~antr/Pastry/pubs.htm. Jun. 23, 2005.

The Gnutella Protocol Specification v0.4, http://www.clip2.com 2000.

About Presentation Broadcasting, 3 pages printed Jul. 1, 2005 from http://office.microsoft.com/en-us/assistance/HP052411931033.aspx.

Ajmani et al., "ConChord: Cooperative SDSI Certificate Storage and Name Resolution," First International Workshop on Peer-to-Peer Systems (IPTPS), Mar. 2002.

Arkko et al., Securing IPv6 Neighbor Discovery And Router Discovery, In Proc. 2002 ACM Workshop.

On Wireless Security (WiSe), pp. 77-86, (Sep. 2002) ACM Press.

Balke et al., "Caching for Improved Retrieval in Peer-to-Peer Networks," L2S Research Center and University of Hannover, 6 pages; htto://www.13s.de/apis/paper/gi-itg05.pdf (2005).

Beaver, K., "Are P2P Applications Worth the Risk?" 2005 TechTarget, http://searchsecuritv.techtarget.com/tip/1,289483,sid14_gci929175,00.html, 5 pages.

Blaze et al., The Keynote Trust-Management System Version 2, IETF Network Working Group (Sep. 1999).

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeting Places for the Internet Community," IEEE International Conference on Multimedia Computing and Systems, pp. 297-301 (Florence, Italy, Jun. 7-11, 1999).

Burrows, M. et al., "A Logic of Authentication" Proceedings of the Royal Society of London Series A, 426, pp. 233-271 (1989).

Campbell, C., Securing Your Peer-to-Peer Networks,: TechTarget, Sep. 12, 2001, http://searchsecurit.techtarget.com/originalContent/0,289142,sid14_gci769396,00.html?MOTT=9.25.

Castro et al. "Topology-Aware Routing In Structured Peer-to-Peer Overlay Networks," Technical Report MSR-TR-2002-82, Microsoft Research, Microsoft Corporation, http://www.research.microsoft.com.

Chen et al. "A Scalable Semantic Indexing Framework for Peer-to-Peer Information Retrieval," 8 pages; http://hdir2005.isti.cnr.it/camera-ready/7.Chen.pdf (2005).

Cheng et al. "Hutchworld: Lessons Learned. A Collaborative Project: Fred Hutchinson Cancer Research Center & Microsoft Research," in Proceedings of Second International Conference on Virtual Worlds (VW 2000), pp. 1-2, (Paris, France, Jul. 5-7, 2000). http://research.microsoft.com/scg/papers/hutchvw2000.pdf.

Cheng, P. "An Architecture for the Internet Key Exchange Protocol," IBM Systems Journal, vol. 40, No. 3, 2001, pp. 721-746.

Cheung, "Chatopus for Palm OS, Using IM Bots for Jabber," Chatopus-Palm OS instant Messaging Client for XMPP/Jabber, Dated Oct. 20, 2002 (Past updated: Jun. 25, 2005), 6 pages, http://www.chatopus.com/articles/bots.html.

Chien, E. "Malicious Threats of Peer-to-Peer Networking," Symantec, http://enterprisesecurity.symantec.com/PDF/malicious_threats.pdf (Dec. 2001).

Cugola et al., "Peer to Peer for collaborative Applications," in Proceedings of the $22^{nd}$ International Conference on Distributed Computing Systems Workshops (ICDCS'02), pp. 359-364 (Vienna, Austria, Jul. 2-5, 2002).

Deering, S. et al., "Version 6 (IPv6) Specification" RFC2460 (Dec. 1998).

DeFigueiredo et al., "Analysis of Peer-to-Peer Network Security Using Gnutella," http://www.cs.berkeley.edu/~daw/teaching/cs261-f02/reports/defig.pdf (2002).

Dorohonceanu et al. "A Desktop Design for Synchronous Collaboration," in Proceedings of the Graphics Interface '99, pp. 27-35 (Kingston, Ontario, Canada, Jun. 1999).

Druschel et al. PAST: A large-scale, persistent peer-to-peer storage utility, at Rice University and Microsoft Research, 6 pages (Nov. 2001).

Duhr, "Oberflachenelementse in interaktiven and kooperativen anwendungen," Universitat Oldenburg, Department of Information Systems Thesis (Aug. 2000).

Eastlake, Domain Name System Security Extensions, IETF Network Working Group (Mar. 1999).

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Ferguson et al., Network Ingress Filtering: Defeating Denial of Service Attacks Which Employ IP Source Address Spoofing, IETF Network Working Group (May 2000).

Garcia et al., "Extending a Collaborative Architecture to Support Emotional Awareness," EBAA '99—Workshop on Emotion-Based Agent Architectures, pp. 46-52 (May 2, 1999).

Greenberg et al., "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, LEA Press (1997).

Gutwin, "Workspace Awareness in Real-Time Distributed Groupware," The University of Galgary, Department of Computer Science, Ph.D. Thesis, 270 pages (Dec. 1997).

Handley et al., "SIP: Session Initiation Protocol," Network Working Group, Request for Comments 2543, pp. 1-153 (Mar. 1999).

Harkins et al., "The Internet Key Exchange (IKE)," RFC2409 (Nov. 1998).

Hinden et al., "IP Version 6 Addressing Architecture," (Feb. 2, 2001).

Housley et al., Internet X.509 Public Key Infrastructure Certificate And Certificate Revocation List (CRL) Profile, IETF Network Working Group (Apr. 2002).

Huitema, "Ipv6 The New Internet Protocol," Prentice Hall PTR, ISBN 0-13-850505-5 (1998).

International Telecommunication Union. ITU-T recommendation X.690, Information Technology—ASN.1 Encoding Rules: Specification Of Basic Encoding Rules (BER), Canonical Encoding Rules (CER) And Distinguished Encoding Rules (DER), (Jul. 2002).

Johnson et al. "Mobility Support in IPv6," (Nov. 17, 2000) 206 pgs.

Karn et al., Photuris: Session-Key Management Protocol, IETF Network Working Group (Mar. 1999).

Kent et al., "Security Architecture for the Internet Protocol," RFC2401 (Nov. 1998).

Kent, C. and Mogul, J. Fragmentation Considered Harmful. Computer Communication Review, (Association of Computer Machinery), 25(1) 75-87 (Jan. 1995).

Kim et al., "A Secure Platform for Peer-to-Peer Computing in the Internet," Proceedings of the 35th Hawaii International Conference on System Sciences, IEEE Computer Society, 2002, pp. 3948-3957.

Kindberg, "Mushroom: A Framework for Collaboration and Interaction Across the Internet," in Proceedings of the Fifth ERCIM Workshop on CSCW and the Web (St. Augustin, Germany, Feb. 1996).

Kollock et al. "Managing the Virtual Commons: Cooperation and Conflict in Computer Communities," in Computer-Mediated Communication: Linguistic, Social, and Cross-Cultrual Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperation: Gifts and Public Goods in Cyberspace," in Communities in Cyberspace, (Smith et al, eds.), pp. 1-17 (Routledge, London UK, 1999) http://www.sscnet.ucla.edu/soc/faculty/kollock/papers/economies.htrn.

Lai et al., Measuring Link Bandwidths Using a Deterministic Model of Packet Delay, at Department of Computer Science at Standford University, 13 pages (Oct. 2000).

Langley, A., The Freenet Protocol, The Free Network Project at http://freenet.sourceforge.net/index/php?page=protocol (May 21, 2001).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996).

Lv, J. et al. "WonGoo: A Pure Peer-to-Peer Full Text Information Retrieval System Based on Semantic Overlay Network," Institute of Computing Technology Chinese Academy of Sciences Beijing, China; Proceedings of the Third IEEE International Symposium on Network Computing and Applications (NCA '04); dated Apr. 2004; 8 pages; http://portal.acm.org/citation.cfm?id=1025936.

Mazieres et al. "Separating Key Management from File System Security," Operating Systems Review ACM, vol. 33, No. 5, Dec. 1999, pp. 124-139.

MeetingMaker—Meeting Maker printout, 2 pages printed on Jul. 1, 2005 from http://www.meetingmaker.com/products/meetingmaker/default.cfm.

Mills, "Simple Network Time Protocol (SNMP) Version 4 for IPv6 and OSI," RFC2030 (Oct. 1996).

Montenegro et al., Statistically Unique and Cryptographically Verifiable Identifiers And Addresses, In Proc. ISOC Symposium on Network and Distributed System Security (NDSS 2002), San Diego (Feb. 2002), pp. 1-13.

Moskowitz, Host Identity Payload and Protocol, Internet-Draft draft-ietf-moskowitz-hip-06.txt, (Oct. 2001) (Work in progress).

Narten et al., Neighbor Discovery For IP Version 6 (IPv6), IETF Network Working Group, (Dec. 1998).

Narten et al., Privacy Extensions For Stateless Address Autoconfiguration In Ipv6, IETF Network Working Group (Jan. 2001).

Nikander, A Scaleable Architecture For IPv6 Address Ownership, Internet-draft (Mar. 2001).

Okazaki et al., Mipv6 Binding Updates Using Address Based Keys (Abks). Internet-Draft, (Oct. 2002).

O'Shea et al., Child-Proof Authentication For Mipv6 (CAM), ACM Computer Communications Review, 31(2) (Apr. 2001).

Perkins, "IP Mobility Support," RFC2002 (Oct. 1996).

QuickTime Broadcaster (3 pages) printed Jul. 1, 2005 from http://www.apple.com/quicktime/broadcaster/.

Red-Black Tree, National Institute of Standards and Technology, at http://www.nist.gov/dads/HTML/redblack.html (Mar. 5, 2002).

Roe et al., Authentication Of Mobile IPv6 Binding Updates And Acknowledgments. Internet-Draft, IETF Mobile IP Working Group (Feb. 2002).

Rowstron et al. Pastry: Scalable, distributed object location and routing for large-scale peer-to-peer systems, at Microsoft Research, Ltd., St. George House and Rice University, 20 pages (Nov. 2001).

Rowstron et al., SCRIBE: The design of a large-scale event notification infrastructure, at Microsoft Research, Ltd., St. George House and Rice University, 20 pages (2001).

Rowstron et al., Storage management and caching in PAST, a large-scale, persistent peer-to-peer storage utiity, at Microsoft Research Ltd., St. George House and Rice University, 14 pages (2001).

Savola. Security Of Ipv6 Routing Header And Home Address Options. Internet-draft, IETF (Dec. 2002).

Schlyter, J. et al. "Using DNS To Securely Publish Secure Shell (SSH) Key Fingerprints," The Internet Society (2006), ftp://ftp.rfc-editor.org/in-notes/rfc4255.txt, dated Oct. 2, 20006, 9 pages.

Shamir, Identity-Based Cryptosystems And Signature Schemes, In Advances in Cryptology: Proc. CRYPTO 84, vol. 196 of LNCS, pp. 47-53, (1998).

Thomas, "Binding Updates Security", draft-thomas-mobileip-busec-00.txt, Nov. 2, 2001, 13 pgs.

Thomson et al., "IPv6 Stateless Address Autoconfiguration," RFC2462 (Dec. 1998).

* cited by examiner

| Bits length "L" | Duration "T" (sec) | Time to spoof (years) | Time to spoof N years in the future, assuming Moore's law continues | | | |
|---|---|---|---|---|---|---|
| | | | 1 year | 3 years | 5years | 10years |
| 35 | 15 | 1.63E+04 | 1.03E+04 | 4.08E+03 | 1.62E+03 | 1.61E+02 |
| 35 | 60 | 6.53E+04 | 4.12E+04 | 1.63E+04 | 6.48E+03 | 6.43E+02 |
| 35 | 240 | 2.61E+05 | 1.65E+05 | 6.53E+04 | 2.59E+04 | 2.57E+03 |
| 35 | 960 | 1.05E+06 | 6.58E+05 | 2.61E+05 | 1.04E+05 | 1.03E+04 |
| 35 | 3840 | 4.18E+06 | 2.63E+06 | 1.05E+06 | 4.15E+05 | 4.12E+04 |
| 40 | 15 | 5.23E+05 | 3.29E+05 | 1.31E+05 | 5.19E+04 | 5.14E+03 |
| 40 | 60 | 2.09E+06 | 1.32E+06 | 5.23E+05 | 2.07E+05 | 2.06E+04 |
| 40 | 240 | 8.36E+06 | 5.27E+06 | 2.09E+06 | 8.30E+05 | 8.23E+04 |
| 40 | 960 | 3.34E+07 | 2.11E+07 | 8.36E+06 | 3.32E+06 | 3.29E+05 |
| 40 | 3840 | 1.34E+08 | 8.43E+07 | 3.34E+07 | 1.33E+07 | 1.32E+06 |
| 45 | 15 | 1.67E+07 | 1.05E+07 | 4.18E+06 | 1.66E+06 | 1.65E+05 |
| 45 | 60 | 6.69E+07 | 4.21E+07 | 1.67E+07 | 6.64E+06 | 6.58E+05 |
| 45 | 240 | 2.68E+08 | 1.69E+08 | 6.69E+07 | 2.65E+07 | 2.63E+06 |
| 45 | 960 | 1.07E+09 | 6.74E+08 | 2.68E+08 | 1.06E+08 | 1.05E+07 |
| 45 | 3840 | 4.28E+09 | 2.70E+09 | 1.07E+09 | 4.25E+08 | 4.21E+07 |

FIG. 5

| Bits length "L" | Duration (sec) | Catalog Size | %name space | Vulnerability |
|---|---|---|---|---|
| 40 | 15 | 2.1E+11 | 19.13431% | 5 |
| 40 | 60 | 5.26E+10 | 4.78358% | 21 |
| 40 | 240 | 1.31E+10 | 1.19589% | 84 |
| 40 | 960 | 3.29E+09 | 0.29897% | 334 |
| 40 | 3840 | 8.22E+08 | 0.07474% | 1338 |
| 45 | 15 | 2.1E+11 | 0.59795% | 167 |
| 45 | 60 | 5.26E+10 | 0.14949% | 669 |
| 45 | 240 | 1.31E+10 | 0.03737% | 2676 |
| 45 | 960 | 3.29E+09 | 0.00934% | 10703 |
| 45 | 3840 | 8.22E+08 | 0.00234% | 42813 |

FIG. 6

| Distinguished Hash H 701 | | | |
|---|---|---|---|
| Call Sign 702 | Unused 703 | Z Zeros 704 | Unused 705 |
| L Bits 706 | | Z Bits 707 | |
| Fixed Position 1 708 | | Fixed Position 2 709 | |

FIG. 7

| Encoding | |
|---|---|
| Value | Symbol |
| 0 | Q |
| 1 | L |
| 2 | 2 |
| 3 | 3 |
| 4 | 4 |
| 5 | 5 |
| 6 | 6 |
| 7 | 7 |
| 8 | 8 |
| 9 | 9 |
| 10 | A |
| 11 | B |
| 12 | C |
| 13 | D |
| 14 | E |
| 15 | F |
| 16 | G |
| 17 | H |
| 18 | J |
| 19 | K |
| 20 | M |
| 21 | N |
| 22 | P |
| 23 | R |
| 24 | S |
| 25 | T |
| 26 | U |
| 27 | V |
| 28 | W |
| 29 | X |
| 30 | Y |
| 31 | Z |

FIG. 8

| Decoding | | |
|---|---|---|
| Symbol | Value | Remarks |
| 0 | (0) | Number zero is not used |
| 1 | (1) | Number one is not used |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| A | 10 | |
| B | 11 | |
| C | 12 | |
| D | 13 | |
| E | 14 | |
| F | 15 | |
| G | 16 | |
| H | 17 | |
| I | (1) | Letter I is not used |
| J | 18 | |
| K | 19 | |
| L | 1 | Lower case "l" looks like 1, I |
| M | 20 | |
| N | 21 | |
| O | (0) | Letter O is not used |
| P | 22 | |
| Q | 0 | Letter Q easily confused with O, 0 |
| R | 23 | |
| S | 24 | |
| T | 25 | |
| U | 26 | |
| V | 27 | |
| W | 28 | |
| X | 29 | |
| Y | 30 | |
| Z | 31 | |

FIG. 9

CALL SIGNS

CROSS-REFERENCE TO RELATED APPLICATION

This application is related to co-pending U.S. Patent Application Methods and Systems for Authenticating Messages Ser. No. 10/401,241, filed Mar. 27, 2003.

BACKGROUND OF THE INVENTION

Keys and cryptographic identifications ("IDs") play a key role in many applications which require user verification, such as computer systems, and the like. In an exemplary peer-to-peer computer system, a user identification ("ID") might be used as a verifier to a systems administrator that a user is entitled to access a network when the ID is presented electronically, such as electronic mail. Alternatively, IDs may be transmitted by voice or by writing.

In the past IDs have been presented manually using business cards or verbally. The IDs are typically a long stream of binary numbers that are not easy to remember. The IDs may be secured using cryptographic processes. However, the protected IDs are typically longer yet and also hard to pass around easily. Thus a user further gives up ease of use when protecting an ID with encryption.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention provides a relatively short "call sign" to identify a user to a computer network. The network may be a peer-to-peer network where individual computers in the network tend to have more responsibility for security than in other networks. The call sign incorporates information about the person presenting the call sign for admittance to the network. The call sign is short and easy to remember, while conventional IDs are typically long and difficult to remember. Call signs also incorporate a "salt" value that is pre-calculated to cause a hash of itself and the personal information to output a fixed length result that is easily transformed to a call sign that includes letters and digits. Information other than the personal information may be included for hashing depending upon the application.

Those having skill in the art would understand the desirability of having a short easily remembered ID that is cryptographically secure. This type of call sign would necessarily be short enough to remember while still providing sufficient security, thus allowing the usability of peer-to-peer, or other, networks to be improved.

Many of the attendant features of this invention will be more readily appreciated as the same becomes better understood by reference to the following detailed description considered in connection with the accompanying drawings.

BRIEF DESCRIPTION OF THE DRAWINGS

The following discussion may be best understood with reference to the various views of the drawings, described in summary below, which form a part of this disclosure.

I. First Embodiment of Call Signs Having an Explicit Number of Zeroes and a Method of Generating Them

FIG. 5 is a table indicating a call sign's vulnerability for various call signs formed from L bits and for distinguished salts calculated for T seconds;

FIG. 6 is a table illustrating the frequency of collisions verses population size for a bit length L of forty-five bits;

II. Second Embodiment Call Signs Having a Requested Number of Zeroes Set by a Verifier and a Method of Generating Them FIG. 7 Illustrates the formation of a call sign according to the second embodiment;

III. Alphanumeric Encoding for Passage of the Call Sign to ASCII

FIG. 8 and FIG. 9 illustrate alpha-numeric coding of a call sign; and

Figure 10:
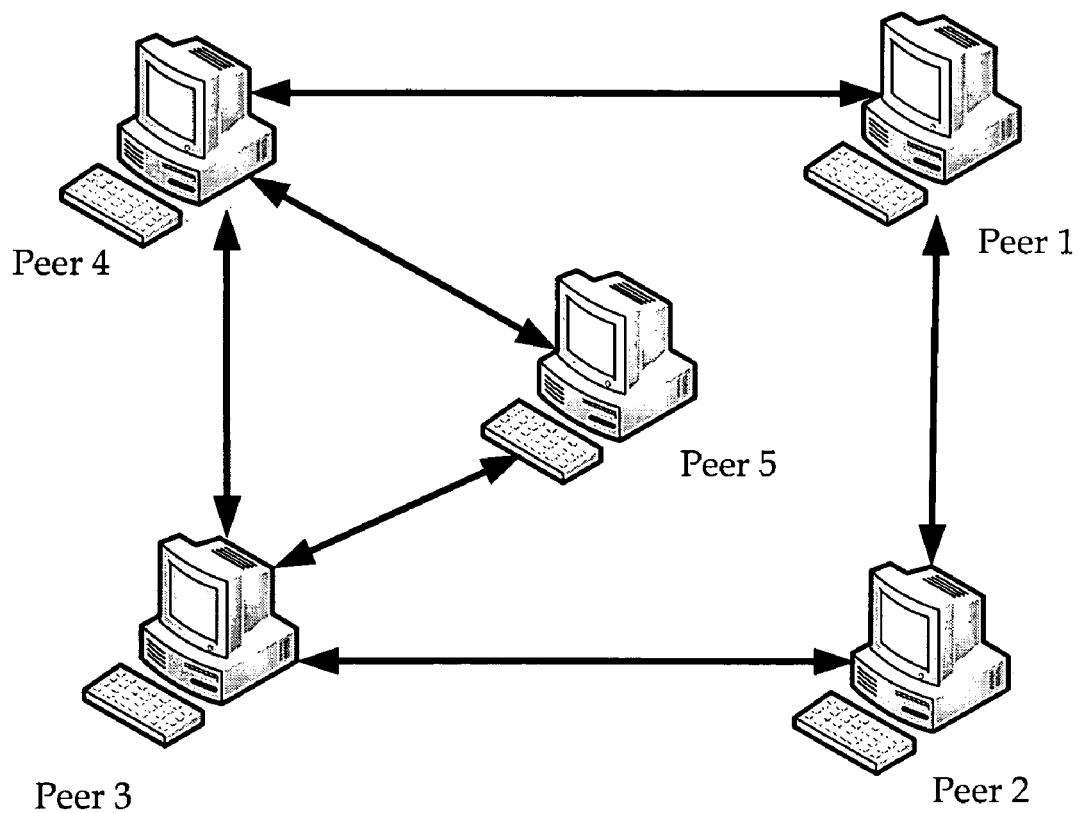

IV. Third Embodiment of Call Signs as Applied to the Peer-to-Peer Name Resolution Protocol FIG. 10 is a flow diagram of the process for generating a call sign as used in the third embodiment of a call sign.

DETAILED DESCRIPTION OF THE PREFERRED EMBODIMENT

The detailed description provided below in connection with the appended drawings is intended as a description of the present embodiments of the invention and is not intended to represent the only forms in which the present invention may be constructed or utilized. The description sets forth the functions of the invention and the sequence of steps for constructing and operating the invention in connection with the illustrated embodiments. However, the same or equivalent functions and sequences may be accomplished by different embodiments that are also intended to be encompassed within the spirit and scope of the invention.

Although the present invention is described and illustrated herein as being implemented in a peer-to-peer computer network system, the system described is provided as an example and not a limitation. As those skilled in the art will appreciate, the present invention is suitable for application in a variety of different types of computer systems.

Figure 1:
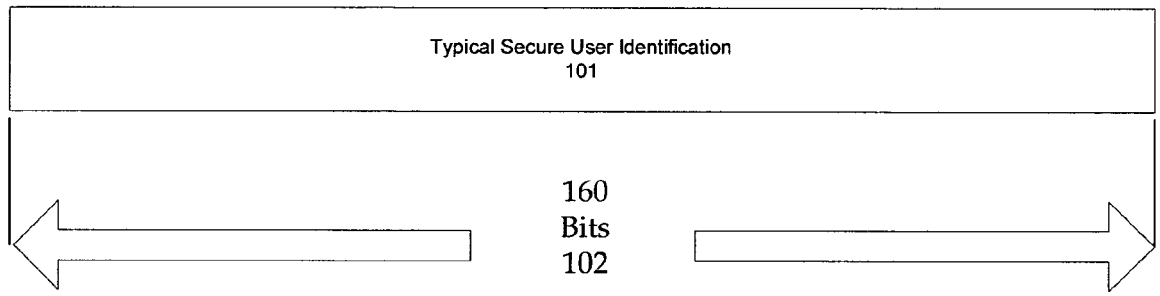
FIG. 1 is an illustration of a typical secure user identification used to allow access to a peer-to-peer computer network.

FIG. 1 is an illustration of a typical secure user identification used to allow access to an exemplary peer-to-peer, or equivalent network. A peer-to-peer computer network is a network of computers that may function without server computers, and in which security is the responsibility of each peer computer in the network. As can be seen an identification 101 used to identify and verify a user's access is typically extremely long. Such a binary number is typically one hundred and sixty binary digits long 102, which is equal to a forty digit hexadecimal number. Another example of an identification 101, is a PNRP name that includes two components, a number represented by forty hexadecimal digits and a character string of arbitrary length. Such an identification is not easily communicated, except by machines.

Many computer networks may call for the generation of peer names typically used in the process of "peer-to-peer" name resolution. As currently implemented, peer-to-peer name resolution protocols (PNRP) are typically constrained to, either use short peer names that can be easily handled by the users (that do not tend to provide adequate security); or use long peer names that include long binary strings (that typically provide a higher level of security) that are not easily handled by the users. Those skilled in the art will realize that shortened identifiers may be applied to any type of computer network, or system where a secure and shortened identification tool is desired.

Long peer names can typically be secured through the application of cryptographic processes. However, such long names typically can not be easily handled by a user. The long names are typically hard to remember and enter to gain access to a computer network. In short, the current state of the art typically forces users to choose between ease-of-use and security. It would be desirable to provide a way to identify a computer in a peer-to-peer network, in a secure way, with a short easily remembered identifier.

Figure 2:
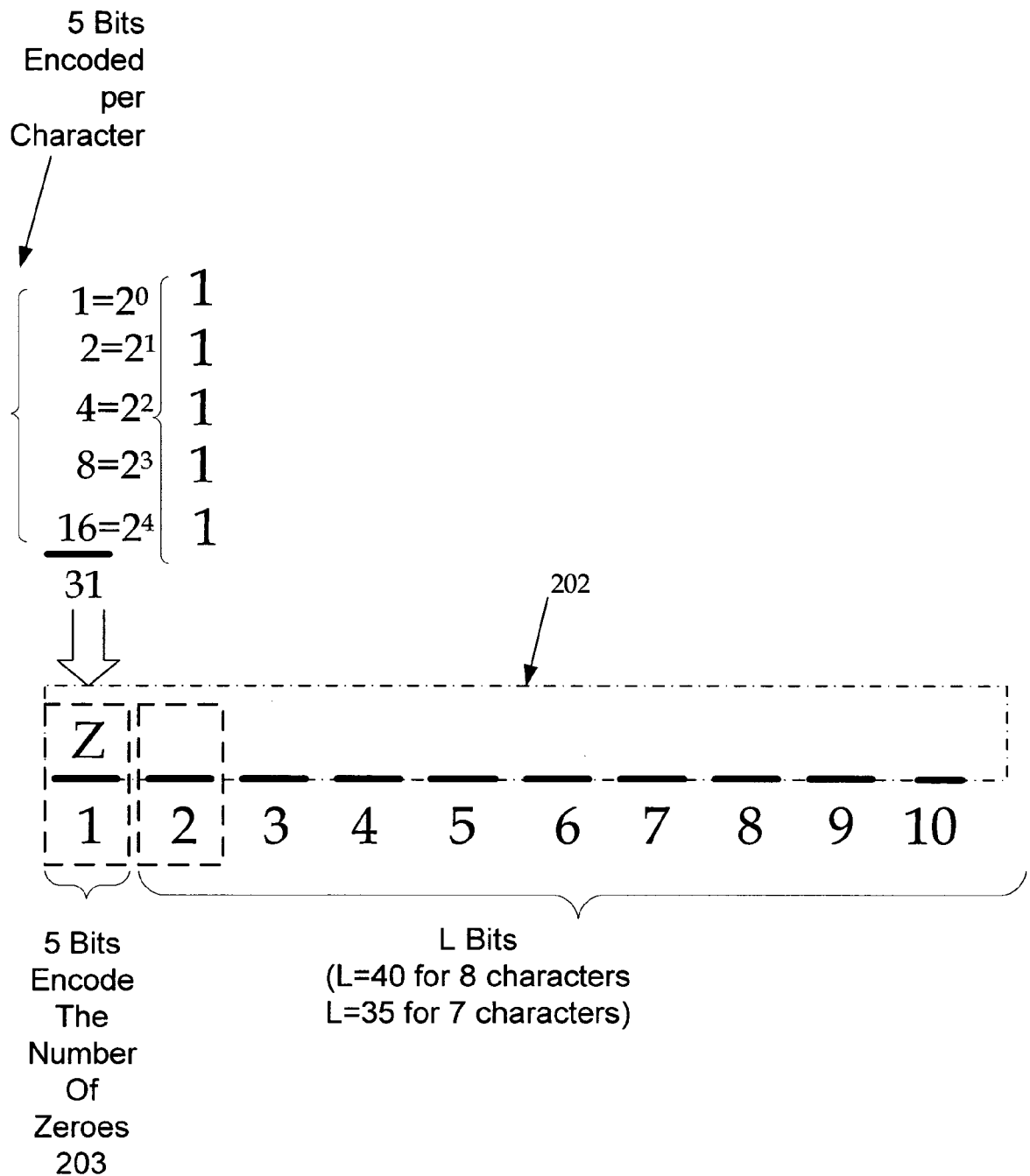
FIG. 2 is a representation of a shortened call sign identifier produced by a first embodiment of a method of generating call signs.

I. First Embodiment of Call Signs Having an Explicit Number of Zeroes and a Method of Generating them FIG. 2 is a representation of a shortened call sign identifier 202 produced by a first embodiment of a method of generating call signs. In particular this embodiment utilizes a "number of zeroes field" in the call sign. Using the system and method for generating secure call signs for peer-to-peer identification ("call signs") described here produces easily remembered security codes or call signs 202, that may be used for identification in peer-to-peer networks ("P2P"), and other equivalent network applications known to those skilled in the art. In particular the specific information used in constructing the call sign, and the cryptographic functions applied allow the use of the call signs in diverse applications. For example an embodiment of the call signs and the method of producing them may be applied to a peer-to-peer name resolution protocol (PNRP). Other applications may include, but are not limited to The method of producing call signs typically used for peer-to-peer identification addresses the difficulty in securely communicating a user's identity. Security is accomplished by using a secure process to construct short call signs that can be easily remembered and entered by users. Such call signs may be strongly protected by a cryptographic process. For example a call sign for peer-to-peer identification such as "ZA4-3Y-4W-ZF4" 202 is short and secure. Such a call sign may be remembered with little more difficulty than remembering ones social security number.

The exemplary call sign illustrated 202 includes ten alphanumeric characters. Those skilled in the art will realize that call signs having more, or less characters may be produced. Each of the ten call sign characters represents five binary bits 203. The segments are portions of a longer binary number that has been broken up into five bit segments. Those skilled in the art will realize that alphanumeric characters may be used in equivalent embodiments to represent binary numbers of lengths either greater, or less than 5 bits.

The first digit in the call sign digits is the letter "Z" as can be seen in this example. In this example, the first digit has been defined to communicate the number of zeroes that are used in decoding the call sign. Here the letter Z has been defined to represent the decimal number 31, which is the five bit binary number 11111. Those skilled in the art will realize that in equivalent embodiments of the invention the placement of the digit identifying the number of zeroes, and the number of zeroes in the call sign may vary. Similarly, any bit pattern or character may be selected in place of "Z" in the example.

The remaining nine alphanumeric characters of this call sign represent the remainder of the binary number. These digits are designated as ("L"). In this example L is forty five bits long. The binary number L has been taken from the result of a cryptographic process used to encrypt the users identification. The remaining L bits in places two through ten are broken into five bit segments that are mapped to the nine remaining alphanumeric characters. Those skilled in the art will realize that the mapping of binary numbers to alphanumeric characters may be done by table lookup, formula, or other equivalent methods known to those skilled in the art. Those skilled in the art will also realize that the ordering of the ten characters may be varied in equivalent embodiments.

After decoding the number of zeroes and the number L from the call sign, cryptographic processing is performed on the binary digits to recreate the user's identity. Once the user's identification has been established then access to a network and other privileges may be granted to the person holding the call sign.

Generating the First Embodiment of the Call Sign from a Distinguished Qualifier

It is assumed that an entity to be named is in possession of a conventionally generated public/private key pair K/P, and a personalization information string, or digital identity, X. The personalization information string may be composed of natural attributes of the entity to be named. For example the personalization information string may include a combination of common name, company name, city, and e-mail address, and the like. The conventionally constructed public key K may be represented by a binary string, and the personalization information string by a text string.

Figure 3:
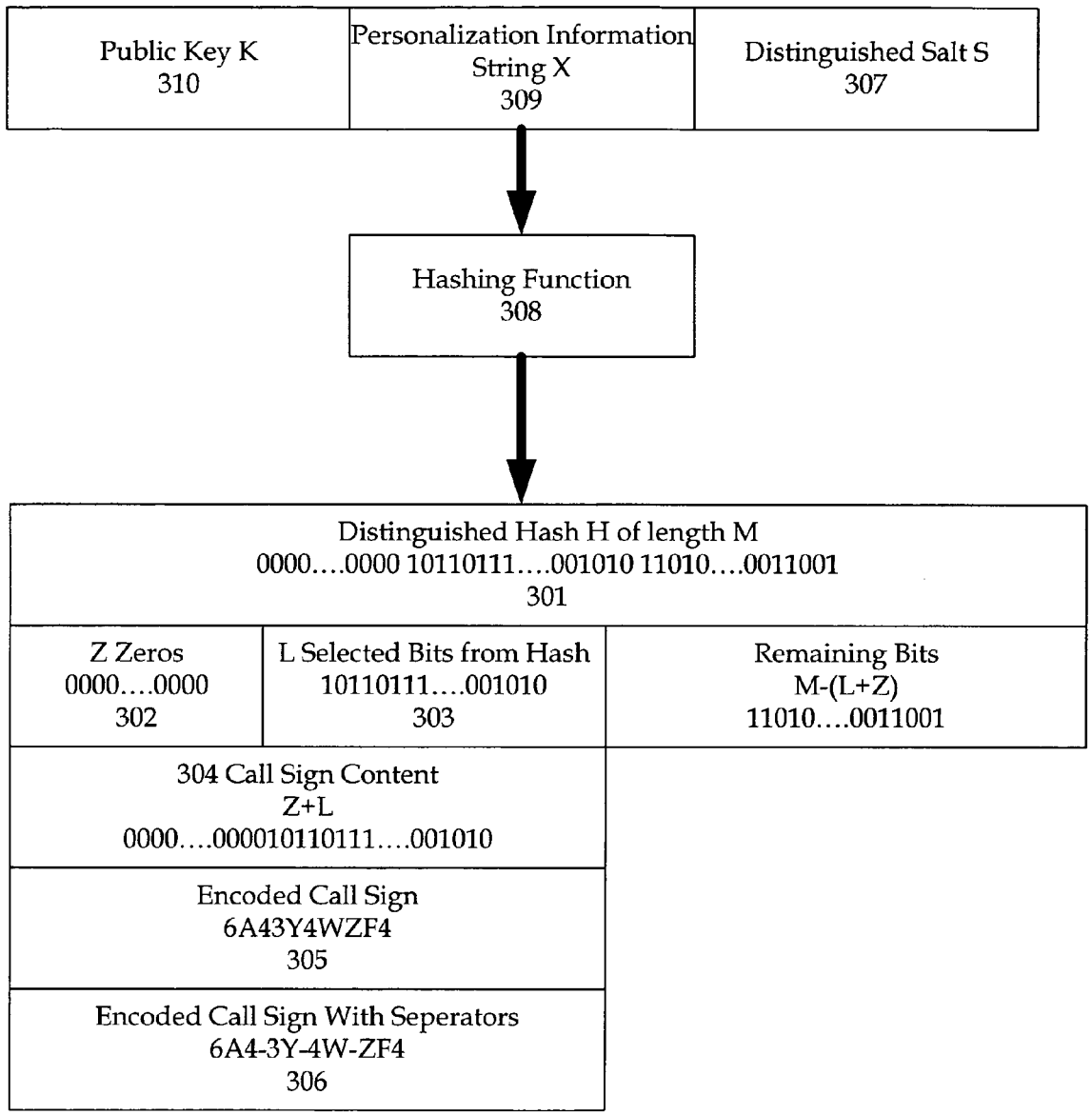
FIG. 3 illustrates the formation of a call sign.

FIG. 3 illustrates the formation of a call sign. The first step of the call sign generation process is to find a "distinguished" "salt" value S, so that when S is hashed 307 along with K 310 and X 309 through a cryptographic one way function ("H(x)") 308 the result is a "distinguished" hash value ("H") 301, that starts with a large number of zeroes. A certain number of zeroes are needed in the subsequent steps of generating the call sign. In finding the distinguished salt many values may be tried over a given time interval and the distinguished salt that produces the desired number of zeroes is retained. The distinguished salt value permits the call sign to pass a verification procedure when a user presents the call sign for authentication.

Those skilled in the art will appreciate that any particular bit pattern may be used in place of leading zeroes. For example, further alternative embodiments may utilize leading ones, or a minimum number of "0110" groups or the like. What is sought in generating the call sign is that part of the call matches a predetermined pattern, while the remainder of the bits that make up the call sign and tend to not have patterns make up the remaining digits of the call sign. Alternately, a predetermined pattern could be obtained from a secondary function rather than the hash function used to produce a distinguished hash value.

Hashing is a process often used in cryptographic processes that produces a fixed-size result by applying a mathematical function called a hashing algorithm, to an arbitrary amount of data. The hash functions utilized in the embodiments are of the type known to those skilled in the art. Typical hashing algorithms include MD2, MD4, MD5, and SHA-1.

The hash functions utilized in the embodiments may be characterized as one way cryptographic hash functions. As will be appreciated by those skilled in the art, one way hash functions typically have several unique properties: it is easy to compute the fixed length hash value or result from an arbitrary length message input; given the fixed length hash value it is difficult to compute the arbitrary length message; and given the arbitrary length message input it is difficult to find another message that will produce the same fixed length hash value.

The distinguished hash, H 301 produced from the distinguished salt and other strings starts with a large umber of zeros (or other equivalent defined bit patterns) in the MSB side of the number produced by the hash. Those skilled in the art will appreciate that in alternate equivalent embodiments the zeros (or other equivalent defined bit patterns) may be located on the LSB digits or other positions or that other characteristics of the described hash or another function could be used as an indicator. The distinguished salt value and the final distinguished hash are found through iterations of the one way hash function evaluated with different salt values. The salt value which results in a hash with the largest number of leading zeros is retained as the distinguished hash. The trials are repeated until a certain amount of time T has elapsed. Those skilled in the art will appreciate that the embodiments of the invention seek to find zeroes for some fixed time "T", under the assumption that an attacker would have to spend a multiple of T to find the same number of zeroes and match forty or forty-five bits. An embodiment of the search process for finding the distinguished salt value may be written as follows:

Initialize the number of zeroes found: Z=0
For a time T do:
   Select a new salt value V
   Compute HV=one way hash (K, X, V)
   Compute Y, the number of leading zeros in HV
   If (Y>Z)
     S=V, H=HV, Z=Y At the end of the specified time T, a distinguished salt S and a distinguished H are found.

The distinguished hash, H is defined as the hash of K, X and S through a cryptographically strong one way function.

Distinguished hash=H=H(K,X,S)

A logical call sign is created from the distinguished hash H that is a binary number. The distinguished hash 301 is of a predetermined number of bits ("M"). M includes the leading zeroes ("Z") 302 of the distinguished hash, and a pre-selected number of the bits ("L") 303 of the distinguished hash value H that immediately follow the last leading zero (or the LSB of the leading zeros).

Once the number of zeros is determined the next step is to determine how many bits, L remaining from the distinguished hash H, are to be included in the content of the call sign. The parameters T (used in finding the distinguished salt) and L are chosen taking into consideration security and scaling considerations. The process presented above has two parameters: the time T during which the trials are run, and the number L of selected bits. These parameters are determined by taking into consideration scaling to a predetermined number of entries, making spoofing attacks by hackers difficult and future proofing the call sign so that it remains secure in the future. Future proofing is typically an exercise in taking into account Moore's law so that the unforgeability of the call sign remains valid as the speed of computers improves. An additional consideration in selecting these parameters is resisting "catalog" attacks from hackers.

Encoding of the Number of Zeroes in the First Embodiment

Once the number of zeroes are found, a way of encoding their number into the call sign must also be found. To generate a short call sign having sufficient security the total number of bits are kept sufficiently small so that they may be encoded in a short digital or alpha-numeric string. The total number of bits to be encoded is the sum of the number L and the number of bits necessary to encode the number of zeroes, Z. Typically, the number Z will be lower than 128, and may be encoded with 7 bits.

In alternative embodiments it is possible, instead of encoding the actual number of null bits, to encode the number of null octets, using 4 bits, or the number of null "4 bits nibbles", using 5 bits. The modified process for finding a sufficient number of nibbles is:

Initialize the number of zeroes found: Z=0
For a time T do:
   Select a new salt value V
   Compute HV=one way hash (K, X, V)
   Compute Y, the number of leading nibbles in HV
   If (Y>Z)
     S=V, H=HV, Z=Y For example twenty-four leading zeroes can usually be obtained in this way in less than a minute on a conventional PC having a 1 GHz CPU.

As will be shown below, the number L, which is the group of bits following the leading zeroes that will make up the call sign, should seldom be lower than 40 bits. The practical range for the number of leading zeroes, Z, is between 24 and 88. Values between 24 and 87 can be encoded using a formula:

$$Z=24+R$$

In this formula, R is a number varying between 0 and 63. Equivalently, the formula below may be used:

$$Z=24+2*P$$

P is a number between 0 and 31 that encodes the number of pairs of zeroes. A number between 0 and 31 is very practical, because it can be encoded as a single alphanumeric character. The modified process for finding a sufficient number of zeroes that may be encoded in a single alphanumeric character is:

Initialize the number pairs of zeroes found: Z=0 repeat:
   Select a new salt value V
   Compute HV=one way hash (K, X, V)
   Compute Y, the number of leading pairs in HV
   If (Y>Z)
     S=V, H=HV, P=Z
Until Z is larger than 24 AND the time T is elapsed
Set Z=Z−12

The next trade-off is the choice of the value L and of the time T. Their selection is discussed later.

The call sign that is suitable for casual exchange is obtained by using a digital or alpha-numeric encoding of the logical call sign, including an encoding of the number of zeroes Z and an encoding of the L selected bits. The Z plus L bits 304 that make up the call sign may be broken into 5-bit segments. Each 5-bit segment is represented by an alphanumeric character. The alphanumeric characters are then assembled into the call sign 305. And finally one or more separators may be added to form the final call sign 306. One may also adopt call sign shortening conventions such as dropping leading "Q"s.

Figure 4:
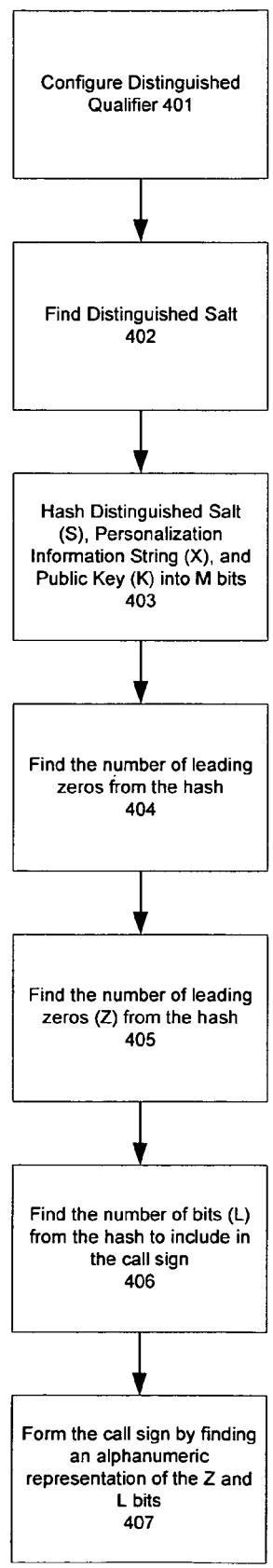
FIG. 4 is a flow diagram illustrating the process of determining a call sign.

FIG. 4 is a flow diagram illustrating the process of determining a call sign. At step 401 a distinguished qualifier is configured. At step 402 the distinguished salt is found. At step 403 the distinguished salt (S), personalization information string (X), and public key (K) are hashed into M bits. At step 404 the number of leading zeros are found from the hash. At step 405 the number of leading zeros (Z) is taken from the hash. At step 406 the number of bits (L) is taken from the hash and included in the call sign. And finally at step 407 the call sign is formed by finding an alphanumeric representation of the Z and L bits.

Call Sign Verification Procedure

When a third party receives a call sign they verify the linkage between the call sign, the public key and the personalization information string by asking the purported owner of the call sign to present the values of the public key K, personalization information string X, and distinguished salt S.

The third party will use a verifier to compute the distinguished hash from K, X, and S. They will then verify that the number of leading zeroes matches the value Z expressed in the call sign, verify that the value Z is no less than a predetermined minimum, and verify that the L bits encoded in the call sign match the corresponding bits in the hash value. As an additional precaution, the verifier will "visually" check that the personalization information string X corresponds to the natural values that are expected.

As previously stated the parameters T and L are chosen with security and scaling considerations. The process presented above has two parameters: the time T during which the trials are run, and the number L of selected bits. These parameters are determined by the need to scale to a predetermined number of entries, the need to not make spoofing too easy, and the need to be future proof, i.e. resist to Moore's law. An additional consideration is the resistance to "catalog" attacks.

Choosing L and T in Consideration of a Possible Spoofing Attack

Any process that links a public key to a short signature has to be concerned with the spoofing attack, in which an attacker finds another public key that results in the same signature.

A common defense is to rely on the difficulty of generating a public key. If the signature is a hash of the public key and some fixed text, and if the signature is L bits long, the attacker will have to generate $2^L$ public keys before finding a match. Those skilled in the art will appreciate that generating a public key involves finding two long prime numbers, which is a very expensive operation. However, only incompetent attackers would try to use standard key generation software to find the matching key. Instead, the attackers would possibly use a process, such as:

Get a first prime.
Add prime to list.
Repeat:

```
Get a first prime.
Add prime to list.
Repeat:
  Get a new prime, P.
  For each prime Q in list:
    Compute N=P*Q (simple multiplication)
    Compute the public key K associated to N
    Compute hash (K, Personalization Information)
    If (hash matches target)
      // we have won
      Return (P, Q)
    End if
  End For
  If size of List < max size
    Add P to list
  End list
End repeat
```

In this process, with a maximum list of size M prime computation only occurs on average once every M loops. By choosing a large M, the attacker effectively minimizes the impact of prime number generation on the run time of the core loop, which ends up being dominated by the cost of the hash function. Relying on the complexity of public key generation is not an efficient defense.

To find a hash that includes Z leading zeroes, the generator will have to perform about $2^{(Z)}$ operations; to find a corresponding hash, the attacker will have to perform about $2^{(Z+L)}$ operations. By choosing sufficiently large values of Z and L, one guarantees that the call signs are hard to spoof, without having to make hypotheses on the generation of prime numbers.

Another popular defense is to increase the cost of the hash function, for example by requesting that a standard hash be run several times, to obtain what one could call a "power N hash". Regardless of cryptographic considerations, a drawback is that the increase in the cost of the hash function is symmetric: it applies to both the generation of the call sign and its verification. This is not a desirable property. One would like to have an asymmetric set up, in which generation may require a lot of computation in order to thwart spoofing attacks, but verification is very fast in order not to impose overdue loads on the readers.

The call sign process requires that the generator performs a large number of trials in order to find an adequate numbers of leading zeroes. This may require a long generation time, but does not affect the verification time, which is only marginally slower than a simple hash comparison.

Choosing L and T in Consideration of a Future Proofing and Moore's Law

The evolution of computing power over time is typically considered in evaluating the cryptographic strength of a hashing algorithm. According to Moore's law, the computing power available for a given cost doubles approximately every year and a half and quadruples every three years. This means that, everything else being equal, the amount of computing power available to an attacker doubles every year and a half. Put another way, an attack that requires a million years today would require less than a year 30 years from now. A code that looks unbreakable now may be quite easy to attack in the future, unless it has been sufficiently hardened, or "future proofed".

To protect the call sign against future attacks the initial number of zeroes are selected to follow Moore's law. By doing this Moore's law benefits the security of the call sign. Instead of over-dimensioning the code so that a long call sign would be produced, the number of initial zeroes is chosen following Moore's law. The codes used today may have a relatively small number of zeroes, but the codes used in a few years will have an increasing number of leading zeroes.

If new codes are generated on new machines, spending the same amount of time in the generation process three years from now will find a hash with two extra zeroes. Those skilled in the art will realize that the cost of generation is proportional to $2^{(Z)}$, and the cost of the attack proportional to $2^{(Z+L)}$. By spending a fixed amount of time in the generation, the attacker will need to spend $2^L$ times that amount for mounting an attack. In short, the attack will be just as hard in 30 years as it is now. For example, if the generation period T is set to 1 minute and the length L is set to 40 bits, generating a spoofed value will require about 2 million years of computation on a current machine, and a call sign similarly generated 30 years hence will still require 2 million years of computation on a similar machine to spoof.

This argument only applies however if the call sign is only used for a short duration. Breaking a 40 bit call sign generated in one minute in 2003 requires 2 million years of computation with the computers available in 2003, or 2 million such computers used in parallel for a year. Breaking a 40 bit call sign generated one minute in 2033 will also require 2 million years of computation with the computers available that year. But the 2033 computers will be able to break the 2003 call sign in only 2 years.

Call signs will thus be subject to some form of obsolescence. A call sign generated in a given year should probably not be used for more than a few years. The overall resilience of a call sign depends on the time spent in the generation and of the number of bits L. A better resilience is achieved by letting the generation process run longer: each doubling of the generation time T will protect against an iteration of Moore's law. In further alternative embodiments a really strong sign may be formed by running the generation process for a long time.

In further alternative embodiments a reasonable protection is provided by associating an expiration date to a call sign. This is particularly attractive if the call sign is used as a bootstrapping mechanism, to find the actual public key of a correspondent. After the public key has been found, the complete information can be used, rather than the compressed information represented in the call sign. The complete information is much less vulnerable to obsolescence.

Choosing L and T in Consideration of the Possibility of Natural Collisions

Even in the absence of attacks, a problem with short codes is the possibility of "natural" collisions when two users happen to pick combinations of keys, personalization information strings, and salt that result in the same call sign.

The bit length L used in the call sign is limited in order to keep the call sign short, while the population of computer users ("P") can be very large. For example, allocating at least one call sign per computer user in a population of $P=10^{10}$ to have less than a 50% chance of collision using methods known to those skilled in the art would have the length L larger than 67 bits. L should be larger than 73 bits if the chances of collision are to be less than 1%.

Bit strings this large would be encoded in a 15 alphanumeric character call sign. This length is above the practical length of a call sign. In short, completely eliminating the possibility of collisions would only be practical if the personalization information string embedded a unique token such as an e-mail address, and if this unique token was securely transferred alongside the call sign.

Since the call sign length is constrained and collisions will occur, a method of detecting collisions may be employed. Collisions are resolved with the resolution of the call sign. If there is a collision, the reader will obtain several versions of the public key, personalization information string, and salt associated to a call sign, all of which pass the first level verification process. The reader selects the "right" or "expected" version based on the personalization information string. The collision resolution process may be iterated by performing the following steps or their equivalents:

1) initiate a search for a call sign;
2) retrieve a public key, personalization information string, and salt associated to the call sign;
3) if there is no such entry available, the search terminates as a failure;
4) perform the verification using the one way function. If it fails, repeat step 2;
5) if the personalization information string matches the expected value, the search concludes successfully; and
6) if the personalization information string does not match, repeat step 2.

If the resolution process is efficient, the key only needs to be long enough to maintain a frequency of collisions compatible with the collision resolution mechanism. For example, it is inefficient to sort through long lists of personalization information strings. Those skilled in the art will realize that collisions will be rather rare, and only involve a couple of matching entries if $2^L$ is sufficiently larger than P: $L > \log 2 P$.

Quantification in Choosing L and T

The first embodiment of the call sign is composed of a set of alpha-numeric characters. Each character encodes 5 bits of information. For length considerations the first embodiment of the call sign should not be more than ten alpha-numeric characters long. One of the ten characters encodes the number of zeroes Z. The remaining 9 characters to encode L bits, which when using 5 bits per character, puts L at 45 bits. Alternative embodiments of call signs with L=35, 40 or 45 bits are also possibilities. In arriving at an L of 45 bits for the first embodiment the criteria given above have been quantified using methods known to those skilled in the art. The values of L may be assigned quantifiable merit to know which of these values will be acceptable; similarly the time T which should be spent searching for zeroes has been quantified.

The previous sections discussing spoofing attacks, catalog attacks, natural collisions, and increased computing power over time are summarized with the following set of criteria: The total Z+L should be large enough to prevent spoofing. The number of zeros Z corresponds to a compute time T. The product $T*2^L$ should be large enough to prevent spoofing, even if we take into account some iterations of Moore's law. The personalization information string should be unique enough to discourage catalog attacks. The length L should be long enough to make name collisions rare, given a probable population size.

Quantification in Choosing L and T in Consideration of Spoofing Attacks

FIG. 5 is a table indicating the selection of bit length L and time T based on defeating a spoofing attack. The table shows how many years of computation will be needed to break the sign, as a function of the number of bits (35, 40, or 45) and the compute time T spent (15, 60, 240, 960, or 3840 seconds). In the table, the double underlined and bolded values are lower than 100,000 years. The computation needed to break a key can be easily distributed to a computer network. Those skilled in the art will appreciate that networks of 100,000 computers may have been used in the past to break cryptographic challenges. To make a call sign resist cracking at least one year to such networks, an L of 35 bits is not the best choice unless the search for zeroes lasts at least 4 minutes.

Values larger than 10,000,000 years are single underlined and italicized these values, would require 100 years of computation on a network of 100,000 present-day computers. As can be seen from the table an L of 45 bits is generally safe. Using an L of 45 bits in combination with search times for zeroes (T) of 16 minutes or more yields a call sign that will likely remain valid for 10 years.

Quantification in Choosing L and T in Consideration of a Catalog Attack

FIG. 6 is a table indicating a call sign's vulnerability for various call signs formed from L bits and for distinguished salts calculated for T seconds. Short codes like the call sign may be subject to a "catalog" attack, a variant of the spoofing attack. In this attack an attacker or a group of attackers generates a large number of call signs "solutions" and stores them in a database, the catalog. Each solution links a public key known to the attacker and a specific value of the call sign. Those skilled in the art will appreciate that the table also indicates the size of the catalog that could be built in one year by a network of 100,000 computers. The "vulnerability" column indicates how many occurrences of the cataloged name should be present in the network for the catalog to include at least one valid call sign.

Those skilled in the art will realize that the catalog attack can only be applied against a popular personalization information string. If the personalization information string included only the first name and surname of a user, the catalog attack would be largely ineffective.

In alternative embodiments it is possible to strengthen the security of the call sign by reducing the frequency of popular names by including additional tokens in the personalization information string. For example a city and a country name may be added to the personalization information string. A catalog attack could then only target users who have the same additional tokens in their personalization information. For example those users with the same first name and surname, and who live in the same city. Those skilled in the art will realize that these users form a relatively small population. Those skilled in the art will appreciate that there will rarely be more than a few hundred such users in a city. From the table it can be seen that combining bit length L of 45 bits and duration T of 4 minutes (240 seconds) provides adequate security in the present application.

In further alternative embodiments the personalization information string includes a unique token such as an e-mail address, and when this token is safely passed as part of the call sign, then a catalog attack is defeated. Such a catalog attack is just as hard to successfully achieve as a spoofing attack.

Avoiding Obnoxious Identifiers

The luck of the draw in generating call signs may result in call signs that are not very desirable, such as "IAM-SO-DUMB". Random chance may even result in call signs including words that are patently offensive, such as some well known four letter words.

The surest way to eliminate these occurrences is to submit the proposed call sign to the user, and let the user either accept the proposed value or ask for another. The design of the computation as 16 sequential steps helps to quickly regenerate another call sign. If a call sign is rejected, it is sufficient in an alternative embodiment to repeat the very last step of the procedure, using only 1/16th of the time necessary for a completely new computation. If the design in which the call sign is derived by a final hash step is maintained, it is possible in yet a further alternative embodiment to introduce at that stage a final salt value, so that new call signs can be derived by simply picking a random number.

Further alternative embodiments embed a protection against undesirable call signs by adding the step of including a list of "unwanted keywords" in the generation process. Such protection of including the keywords makes the code itself somewhat obnoxious. However, in the alternative embodiment, the alphanumeric encoding of binary values is of concern. We can include in the program the binary values are encoded rather than the actual keywords. They are present but in unreadable form.

II. Second Embodiment Call Signs Having a Requested Number of Zeroes Set by a Verifier and a Method of Generating them There are some possible areas of improvement in the first embodiment. It may not be necessary to encode the number of leading zeros in the call sign, thus allowing for either shorter call signs, or call signs that are equally long but contain a larger number L of significant bits. Also, undesirable results may occur with alpha-numeric encodings. They can inadvertently result in "readable" character strings that contain offensive words. A call sign generation process should make sure that such words are avoided.

Encoding the Number of Zeroes in the Second Embodiment

The encoding of the number of zeroes in the first embodiment is a compromise. It supposes that the number of zeroes will always be larger than 24 and lower than 98, and that encoding the number of pairs rather than the number of zeroes provides sufficient granularity.

More fundamentally, the encoding of the number of zeroes in the call-sign assumes that the owner of a call sign should decide how many zeroes are necessary. In the first embodiment the time spent looking for a distinguished salt is fixed, with the assumption that the number of zeroes found during that time will "follow Moore's law", and be representative of the average capacity of computers that year. However, the fixed time limit creates a dependency between the power of the computer used to generate the call sign and the strength of that call sign. In the second embodiment, we assume that the necessary number of zeroes will be determined by the receiver of the call sign.

This embodiment encodes a check in the verification code. A receiver of a call sign will obtain the public key K, the identifier X, and the distinguished salt S, and will then verify that the number of zeroes Z in the hash is larger than a minimum value, function of the year Y and the number of significant bits L:

$$Z > Z0 - L + (Y - 2003)/X$$

In this formula, the number Z0 is set to represent a key length that was considered sufficiently strength in the year 2003. The coefficient X describes the number of years needed to double the capacity of the average computer. For practical implementations, we set the value of X to 1.5, according to Moore's law, and the value of Z0 to 62, resulting in the formula:

$$Z > 62 - L + (Y - 2003)/1.5$$

In this formula, the number 62 is computed assuming that 100,000 years of computing is a sufficient hurdle. In fact, the "bar" may well depend on the context in which the call sign is used. Financial application may require a larger value, e.g. 66 (1,000,000 years). Military services may be even more demanding.

FIG. 7 Illustrates the formation of a call sign according to the second embodiment. Since the call sign does not encode the number of zeroes, we cannot use the same hash functions as in the first embodiment. The L bits that compose the call sign will be located at a fixed position in the distinguished hash, while the zeroes will be counted after another fixed position.

III. Alphanumeric Encoding for Passage of the Call Sign to ASCII

FIG. 8 and FIG. 9 illustrate alpha-numeric coding of a call sign. In creating a call sign it is desirable to pick letters and/or numerals for the call sign that are readily distinguished from each other and tend not to be prone to transcription errors. The peer identifiers are assigned an alphanumeric representation. The exemplary encoding chosen in the embodiments does not use the numbers 0 and 1 or the letters O and I in the resulting call sign. Those skilled in the art will appreciate that these letters are not used since they tend to be easily confused with each other, but alternative embodiments may use these characters. Those skilled in the art will also appreciate that further alternative embodiments may eliminate, or add other characters. Those skilled in the art will realize that in practice alternative embodiments of the invention are not limited to Roman characters and Arabic numerals. Those skilled in the art will also realize that all numbers or all characters may be utilized as long as the desired number of symbols may be generated. In the exemplary embodiment the elimination of the undesired characters leaves 8 digits and 24 letters, which provide 32 symbols, as shown.

As can be seen above, in producing a call sign the process assigns a numerical value from 0 to 31 for each character that has been picked for use in the call sign, yielding 32 available symbols. When the call sign is read by the computer, each character of the call sign is assigned a numerical value in the computer memory. When a call sign is output from the computer, each number that makes up the call sign in the computer is assigned a number or letter to make up the call sign output to the user. The combination of characters that make up the call sign are chosen by a call sign generation procedure. Their validity is then checked by a call sign verification procedure.

IV. Call Signs Applied to in the Peer Name Resolution Protocol (PNRP)

FIG. 10 is a block diagram of a peer-to-peer network utilizing an embodiment of peer-to-peer call signs. Peer-to-peer network technology provides real time communication across one or more distributed networks. Peer-to-peer networking is a serverless technology. In peer-to-peer networks individual PCs can, without internet servers, exchange data, share resources, locate other users, communicate, and collaborate in real time. PCs typically include application software that allows peer-to-peer communications when the PC is coupled to a peer-to-peer network. In this type of network each of the peer computers is responsible for its own security. Thus, verification of authorized users and the resolution of conflicting addresses are tasks that are performed somewhat differently than on a server based network.

Connecting to a peer group, and subsequently joining the peer group are common tasks in peer networks that utilize security precautions in identifying users. To join a group, a peer computer receives an invitation from the owner of a peer group. To receive an invitation from the group owner, the tentative group member must first pass identifying materials to the group owner, which are its peer name and public key. This information is passed using email, file sharing, XML, or the like. The group owner will next issue an invitation to the tentative group member.

When the tentative group member receives the information, the tentative group member uses the invitation information to connect to the group. To connect to the group, the tentative group member uses PNRP and the group ID to resolve the address of a group member, and connect to the peer network through that group member.

Mutual authentication between the tentative group member and the current group member occurs, typically through a web of trust. After mutual authentication, the tentative group member is now a new group member that has a single neighbor. The neighbor is the computer from the peer network that has accepted the connection and with which the authentication occurred.

In particular with respect to connecting to a peer-to-peer computer network, a peer-to-peer network includes infrastructure networking software that provides a set of networking application program interfaces ("APIs") for networking. These peer-to-peer applications may relate to collaborative communications, content distribution and the like. Peer-to-peer infrastructure API software may include the following components; peer name resolution protocol, multipoint communications, distributed data management, secure peer identities, and secure peer-to-peer groups.

The Peer-to-Peer Name Resolution Protocol (PNRP) allows peers in a peer-to-peer network to resolve "peer names" without involving servers, as would typically be needed in a server based network. The PNRP allows the peer computers to identify the other computers, or peers, in the network. The peer name resolution protocol provides an application program interface (API) that enables peer-to-peer resolution of names to endpoints, or nodes in the network that may conflict.

The peer name resolution protocol (PNRP) API is a name to IP resolution protocol that allows a group of participating peers to interact with each other by allowing computer nodes to find each other in the peer-to-peer network. Tasks that would typically be provided in a peer-to-peer network include registering and un-registering peer names, resolving peer names, and enumerating groups of peers. As will be appreciated by those skilled in the art resolving peer names includes finding peer names that do not conflict with each other. In addition to finding names that do not conflict with each other, it is desirable that the names found provide adequate security, and that users can remember their peer names.

Peer names are stable names that may identify computers, users, groups, or services. A peer name typically includes an authority that tells if the peer is secure, and a classifier that is simply a string of characters. As will be appreciated by those skilled in the art secure peer names may typically use the secure hash algorithm (SHA-1) or the MD5 algorithm to derive a 128-bit PNRP identifier to hash the public key K to the classifier C to provide secure transmission of the peer name. In the third embodiment C includes an identifier X, a salt S, and the identification of the hashing algorithm.

Cryptographic keys are devices known to those skilled in the art to provide security in network communications. Cryptographic keys are commonly used in a peer-to-peer environment to authorize access, and verify the identity of a source. Cryptographic keys allow the person in possession of the key to access data the key is associated with, or to forge the key owner's digital signature. Public key algorithms typically provide a pair consisting of a public key and a private key, denoted as K/P. The private key must be kept private and secure since it can be used as an identifier to the receiver of a message. The public key can be distributed freely so that others may decode a message. The public key of a key pair is often distributed with a digital certificate. When one key of a key pair is used to encrypt a message, the other key from that pair is used to decrypt the message.

These keys tend to be long, typically at least 256 hexadecimal digits. Thus passing them, and especially passing the public key can be cumbersome. Instant messaging or e-mail can be used but are prone to tampering, making verification of the key desirable. It is also desirable to include in the process of verification of the key, a verification that the person receiving the key is the person the sender intended to send the key to.

IV. Third Embodiment of Call Signs as Applied to the Peer-to-Peer Name Resolution Protocol The Peer-to-Peer Name Resolution Protocol ("PNRP") allows peers to resolve "peer names" without involving servers. The PNRP peer names are composed of two fields: first the "authority", which is the SHA-1 hash of a public key; and second the "qualifier", which is a Unicode text string. PNRP derives from these two fields a 128-bit PNRP-ID, using a cryptographic hashing function such as:

$$PNRP\text{-}ID = hash(authority, hash(qualifier))$$

This third embodiment augments the PNRP with a "call sign". In order to generate a call sign for PNRP, the user will generate a "distinguished qualifier". The combination of authority, a distinguished salt, and distinguished qualifier results in a PNRP-ID that starts with a large number of zeroes. The call sign is derived from this PNRP-ID. A new PNRP API allows users to enumerate the PNRP entries that match a call sign, and then to obtain the associated authority and qualifier.

The Distinguished PNRP Qualifier

A distinguished qualifier is formed from a personalization information string, the identifier of the secondary hash function, and a distinguished salt, separated by the delimiters "//" and "/". Those skilled in the art will appreciate that the content of the personalization information string may vary depending upon the application in which the call sign is being used. For example the exemplary embodiment of PNRP call signs uses a unique personalization information string while other applications may call for different personalization strings.

Those skilled in the art will appreciate that the strings are separated by delimiters or other equivalent methods known to those skilled in the art. Those skilled in the art will also realize that the order of the strings, and the delimiters used may vary.

The hash function used is also included in the distinguished qualifier, and set off by delimiters. As will be appreciated by those skilled in the art the hash function may be of any type known to those skilled in the art that will yield sufficient security. For example the SHA-1 hash functions or its equivalent.

The salt is chosen during the call sign generation process. The salt is selected by performing a secondary hash of the peer name, causing the hashed result to start with a sufficient number of zeroes. The salt itself is composed of ASCII letters and digits. The formal syntax will be:

Distinguished Qualifier =<personalization>"//"<hash-function>"/"<salt>

An example of a distinguished qualifier is:
Qualifier:JonSmith<jsmith@yuhoo.com>//SHA1/A5E5F3Z4YWZTRF0TW9RTQ The salt will be chosen so that the secondary hash of the authority and qualifier starts with a large number of zeroes.

Generation of the Third Embodiment of the Call Sign

The purpose of the Call Sign generation procedure is to find a distinguished qualifier that permits the peer name and associated call sign to pass the verification procedure. This includes finding an adequate "distinguished salt", so the secondary hash of the peer name starts with an adequate number of zeroes.

As seen in the verification section the adequate number of zeroes varies over time. The formula $$Z>17+(Y-2003)/1.5$$

is used for these purposes.

For generation purposes, the value Y should not be set to the current year, but rather to the year until which the call sign is expected to remain valid. By default, this will be set to the current year plus 10.

The generation proceeds as follows:
1) Initialize the value of the PNRP name authority, as per PNRP, using the canonical form of this authority as expected in the verification procedure.
2) Initialize the value of the personalization information X according to the user name.
3) Choose a valid secondary hash function, by default SHA-1, and note the corresponding identifier I.
4) Choose the adequate number of zeroes Z.
5) Repeat:
a. Pick a Salt S.
b. Compose the peer name based on the authority and the tentative distinguished qualifier, based on X, I, and S.
c. Compute the hash of the peer name according to the function I.
d. Measure the number of zeroes (N) in this hash.
Until the number N is larger than or equal to the number Z.
6) Compute the PNRP identifier associated to the peer name.
7) Compose a Call Sign based on the most significant 45 bits of the PNRP identifier.
8) Verify that the Call Sign does not include an offending word; if it does, repeat step 5.

Step 5 is expected to last about 15 seconds on a modern computer.

The last step in the generation function is meant to check that the random set of characters in the call sign does not result in some offensive language. It can be implemented by asking the user whether they accept to use the proposed call sign.

Verification of the Call Sign Generated in the Third Embodiment

The call sign verification procedure compares the peer identifier to the call sign, and verifies that a secondary hash includes a sufficient number of leading zeroes, Z. Verification of the number of leading zeros makes the call sign hard to spoof by third party. In first approximation, the cryptographic strength of the call sign is equivalent to the strength of a symmetric key whose length is Z+45. The value of Z may vary over time. As Moore's law predicts that computers become more and more powerful, the length requirement for Z will tend to increase. If Moore's law is assumed to hold for the foreseeable future, the value for the number of leading zeros, Z may be thought to be a function of the current year Y:

$$Z>17+(Y-2003)/1.5$$

Those Skilled in the art will realize that the value 17 used in the above inequality corresponds to a chosen security to computing tradeoff, and that a larger value may be chosen in more demanding environments.

The secondary hash function used to verify the call sign may change over time. In the current implementation, the hash function SHA1 known to those skilled in the art is used. In alternative embodiments, a list of acceptable hash functions may be maintained by the computer memory for use. In particular it is anticipated that hash functions will continue to be developed to provide improved security. Embodiments of the invention accommodate the development of new hash functions, by providing for their future use as they arise.

The verification shall proceed as follow:
1) Compute the PNRP identifier associated to the peer name.
2) Compare the most significant 45 bits of the PNRP identifier to the 45 bits encoded in the Call Sign.
3) If the 45 bits do not match, the verification fails.
4) Extract the identifier of secondary hash function from the distinguished salt.
5) If the hash function identifier is absent, is not acceptable to the verifier, or is not recognized as a valid value, the verification fails.
6) Compute the hash of a canonized version of the entire Peer Name with the specified secondary hash function.
7) Measure the number of leading zeroes in the resulting hash. If the number of zeroes is less than the target value Z, the verification fails.
8) Verify that the identification string is a plausible description of the person or entity designated by the call sign; if this is not the case, the verification fails.
9) If steps 1 to 8 are passed, the verification succeeds.

The "canonicalized version" of the Peer Name is obtained by making sure that the authority part of the peer name, normally composed of hexadecimal digits, is only encoded with digits and the upper case letters A, B, C, D, E, and F. Note that step 8 typically involves a human interaction.

Retrieval of PNRP Records from a Call Sign

In some cases, it may be useful to retrieve the PNRP record associated to a call sign, and thus the associated Peer Name. This can be achieved by: retrieving all the PNRP records whose PNRP identifiers start with the same 45 bits as the call sign; retrieving the corresponding peer names; eliminating the peer names that cannot pass steps 1 to 7 of the verification procedure; and using step 8 of the verification procedure to only retain the names that match the expected identity.

The embodiments of the invention in which an exclusive property or privilege is claimed are defined as follows:

1. A method of generating a call sign comprising:
   determining a distinguished qualifier, the distinguished qualifier comprising a public key of a public/private cryptographic key pair associated with a user;
   iteratively testing salt values for at least a predetermined time and until a distinguished salt that when hashed with the distinguished qualifier causes a hash result to contain a predetermined pattern of at least a predetermined minimum number of bits is found;
   hashing the distinguished salt with the distinguished qualifier to create a distinguished hash; and
   encoding a predetermined number of bits of the distinguished, the predetermined number of bits being selected from a portion of the distinguished hash, the portion being selected at a location relative to the predetermined pattern, to create a call sign for the user;
   wherein the above steps are performed by a computer.

2. The method of generating a call sign of claim 1, wherein finding the distinguished salt includes finding a salt that causes the hash result to contain the minimum number of the predetermined pattern of bits in a predetermined time.

3. The method of generating a call sign of claim 2, wherein the predetermined pattern of bits comprises a number of leading zeroes.

4. The method of generating a call sign of claim 3, further comprising retaining a number of bits, less than a total number of bits, following the leading zeroes.

5. The method of generating a call sign of claim 4, further comprising encoding the number of leading zeroes into an alphanumeric call sign zeroes digit.

6. The method of generating a call sign of claim 5, further comprising encoding the number of bits following the leading zeroes into a plurality of alphanumeric call sign digits.

7. The method of generating a call sign of claim 6, further comprising forming a call sign from the call sign zeroes digit and the plurality of alphanumeric call sign digits.

8. The method of generating a call sign of claim 4, wherein the encoding step comprises:
   creating a binary number from a plurality of digits that follow the leading zeroes of the distinguished hash;
   dividing the binary number into a plurality of five bits segments; and
   encoding each of the five bit segments into corresponding alphanumeric characters.

9. The method of generating a call sign of claim 8, in which the binary number is forty five bits long.

10. The method of generating a call sign of claim 8, in which the alphanumeric zero character is in the most significant bit (MSB) positions.

11. The method of claim 1, wherein the distinguished qualifier comprises personalization information associated with the user, and wherein hashing of the distinguished salt with the distinguished qualifier to create a distinguished hash comprises:
   hashing the public key to form a first hash result;
   hashing the distinguished salt and the personalization information to form a second hash result; and
   hashing the first and second hash results together to create the distinguished hash.

12. The method of claim 1, wherein the distinguished qualifier comprises personalization information associated with the user, and wherein hashing of the distinguished salt with the distinguished qualifier to create a distinguished hash comprises:
   hashing the public key to form a first hash result; and
   hashing the first hash result, the distinguished salt and the personalization information to create the distinguished hash.

13. A method of producing a cryptographic hash comprising:
   forming a personalization information string associated with a person;
   determining a minimum number of bits based on the time at which the cryptographic hash is produced;
   finding a distinguished salt value that when hashed with the personalization information string and a public key of a public/private cryptographic key pair associated with the person, produces a hashed result that has a bit pattern with at least the minimum number of bits;
   hashing the distinguished salt value with the personalization information string and the public key to generate a distinguished cryptographic hash; and
   encoding a portion of the distinguished cryptographic hash as a plurality of alphanumeric characters representing a call sign for the person,
   wherein the above steps are performed by a computer.

14. The method of producing a cryptographic hash of claim 13, in which the personalization information string includes a person's name.

15. the method of producing a cryptographic hash of claim 13, in which the personalization information string includes a person's e-mail address.

16. The method of producing a cryptographic hash of claim 13, in which the personalization information string includes a person's company name.

17. The method of claim 13, wherein the minimum number of bits is determined as a function of a year in which the cryptographic hash is produced.

18. A method of producing a call sign comprising:
   configuring a distinguished qualifier for a user, the distinguished qualifier comprising a public key of a public/private cryptographic key pair associated with the user and a personal identifier for the user;
   finding a distinguished salt which when hashed with the distinguished qualifier generates a hash having a predetermined bit pattern with a size meeting a predetermined criteria in a predetermined portion of the hash, the criteria being such that the size increases as a function of the time at which the call sign is produced;
   hashing the distinguished qualifier and the distinguished salt into an M bit hash;
   selecting a predetermined number, L, bits from the M bit hash; and
   encoding the size of the predetermined bit pattern into one digit of an alphanumeric call sign by using table lookup and encoding the L bits as other digits of the alphanumeric call sign;
   wherein the above steps are performed by a computer.

19. The method of claim 18, wherein the criteria is a function of a year in which the call sign is produced.

20. The method of claim 18, wherein the distinguished qualifier comprises personalization information associated with the user, and wherein hashing of the distinguished salt and the distinguished qualifier into M bit hash comprises:
   hashing the public key to form a first hash result;
   hashing the distinguished salt and the personalization information to form a second hash result; and
   hashing the first and second has results together to create the M bit hash.

* * * * *